Dec. 1, 1931.  D. D. LAW  1,833,907
WEED EXTERMINATOR
Filed Sept. 11, 1929

Inventor
David D. Law
By Lynn H Latta
Attorney

Patented Dec. 1, 1931

1,833,907

UNITED STATES PATENT OFFICE

DAVID D. LAW, OF BRONSON, IOWA

WEED EXTERMINATOR

Application filed September 11, 1929. Serial No. 391,800.

My invention relates to implements of the type adapted to provide a poisonous liquid for application to weeds, and to apply said liquid to the weeds so as to kill their growth.

An object of my invention is to provide an implement of this nature, which is of simple, durable, and inexpensive construction.

A further object is to provide such an implement, which is adapted to be accurately controlled so that liquid may be applied by it only to the roots of a weed to be exterminated, and the surrounding plants, such as a growth of lawn grass, be left uninjured.

My invention further contemplates an implement of this variety which is very easily and accurately handled by the operator without difficulty.

Another object is to provide an instrument of this class which may be rapidly handled without changing the hands from one position to another during operation.

Another object is to provide such an implement which may be adjusted to vary the amount of liquid which it will deliver in a single charge.

With these and other objects in view, my invention consists in the construction, arrangement and combination of the various parts of my invention, whereby the objects contemplated are attained, as hereinafter more fully set forth, pointed out in my claim, and illustrated in the accompanying drawings, in which:

Figure 1:
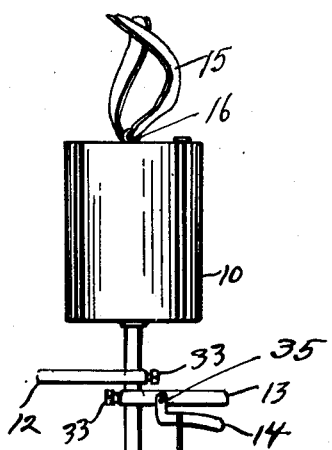
Fig. 1 is a side elevation of the implement.
Figure 2:
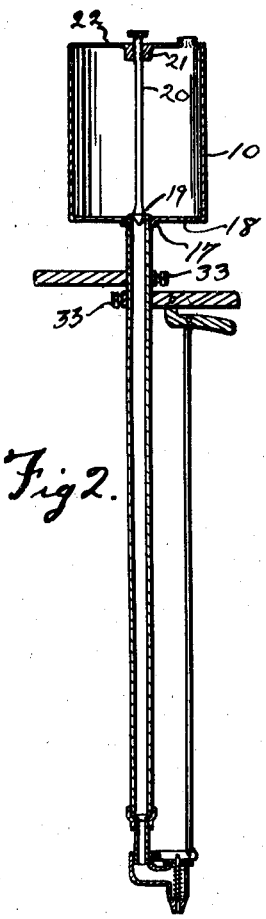
Fig. 2 is a longitudinal sectional view through the same.
Figure 3:
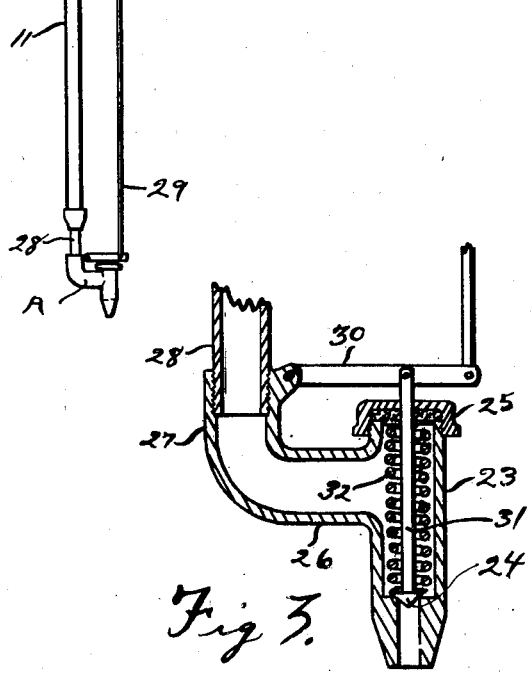
Fig. 3 is a detail sectional view of the valve which controls the delivery of the liquid from the implement.

The implement of my invention comprises generally a liquid supply tank 10, a liquid conducting or feed pipe 11 communicating with the tank 10, a delivery valve A at the end of the pipe 11, a pair of handles 12 and 13 by means of which the operator grasps and controls the implement, and a valve lever 14, adapted to be engaged by the hand of the operator to control the delivery valve A.

The implement is suspended from the neck or shoulders of the operator by means of a shoulder strap 15, which is preferably in the form of a simple loop, secured in a ring 16 on the tank 10, and placed about the neck of the operator, to support the tank in a position resting against the operator's chest.

The general features mentioned above are not new in devices of this character, and my invention resides in the arrangement of these features in such relation as to provide an implement which may be very easily, economically, and accurately handled, as well as one that is simple and inexpensive in construction.

The tank 10 is provided with a threaded boss 17 in its bottom wall 18, into which the upper end of the feed pipe 11 is threaded. The boss 17 serves as the means for rigidly connecting the tank and pipe.

The upper edge of the feed pipe 11 serves as a valve seat for a needle valve 19, which is provided with a valve stem 20 threaded through a threaded boss 21 in the top wall 22 of the tank 10. The function of the needle valve is to regulate the rate at which liquid may flow from the tank.

It is very essential that a sufficient amount of poisonous liquid be supplied to kill the particular weed being operated upon, and that the poison be placed only on the weed. At the same time, it is desirable to economize as much as possible in the use of the liquid. The amount of liquid which will flow during a given period of time is regulated by the needle valve which controls the size of the fluid passage. I have found that the flow may be controlled as readily at the top of the pipe 11 as at the bottom, even though the valve which stops and starts the flow is located at the bottom. It is of course essential, in order to guard against dripping of the poison on the plants to be conserved, to cut off the flow at the lower extremity of the conducting tube.

The delivery valve is of the type which is opened by pulling a valve element away from its seat. It comprises a valve casing 23, provided with a valve seat 24, a threaded cap 25 opposed to the seat 24, and an integral, laterally extended connection including a horizontal neck portion 26 and a vertical neck portion 27 forming a continuation of the neck 26 at right angles thereto to receive the threaded lower end of the pipe 11 or a nipple 28, acting as a union.

The specific features of the valve do not enter into my invention, except in combination with the other features of arrangement of the parts of the implement. For instance, it has been my purpose to arrange the valve so that its delivery nozzle is substantially parallel with the pipe 11, and to offset it relative to the pipe so that a direct pull connection might be had between the valve and the lever 14. This connection comprises a rod 29, connected to the lever 14 and to the lever 30 of the valve. The lever 30 is pivoted to the neck 27, and the valve pin 31 is pivoted to the lever 30. A spring 32 holds the valve element normally against its seat 24.

The handles 12 and 13 are mounted on the pipe 11, and are secured by set screws 33. They are positioned extending substantially diametrically opposite each other, so that the implement may be grasped by the two hands of the operator on opposite sides of the feed pipe 11, which is to be manipulated so that its lower end is accurately positioned relative to the weed to be poisoned. The handles are positioned below the tank, yet high enough so that they may be comfortably reached by the hands of the operator.

The positioning of the tank above the handles is an important feature of the invention, since it brings the tank as near to the center of swing of the implement as possible, minimizing the amount that the tank must be swung in manipulating the device, and giving maximum leverage to the handles. Were the tank to be positioned below the handles, the operator would have to swing the tank as well as the delivery pipe, and the inertia of the tank would thus seriously interfere with accurate and rapid handling of the implement. With my arrangement, the tank virtually acts as a fulcrum about which the entire device oscillates during manipulation. This is especially true when the tank is allowed to rest against the chest of the operator.

Another important feature of my invention is that of pivoting the valve control lever 14 to the handle 13 as at 35. By this arrangement, the operator may release a charge of liquid without removing his hand from the handle. Since it is desirable to maintain the nozzle of the delivery valve accurately in position relative to the weed being poisoned, while delivering the liquid, it will be seen that this feature is a very advantageous one. It will be remembered that my implement is designed for rapid manipulation, and to this end the nozzle is not designed to be extended below the surface of the earth. Therefore it is necessary to hold it in position while applying the liquid.

In using the device, the nozzle of the delivery valve is swung to position above a weed, and then lowered to a position near the roots thereof. The valve is then opened and a charge of liquid deposited at the roots of the weed. The valve is then closed before the implement is moved, so that no liquid will drip upon the plants which it is not desired to destroy. In exterminating dandelions, for instance, the grass which it is desired to preserve grows very close to the roots of the dandelions or other weeds which it is desired to remove.

The liquid ordinarily to be used in connection with my implement in exterminating dandelions is kerosene or gasoline.

Some changes may be made in the construction and arrangement of the various parts of my invention without departing from the real spirit and purpose thereof, and it is my intention to cover by my claim, any modified forms of structure or the use of mechanical equivalents which may be reasonably included within its scope.

I claim as my invention:

In a device of the class described, a tank, a feed pipe secured to the bottom of the tank, a pair of handles secured to the feed pipe, a valve casing provided with a laterally extended connection secured to the lower end of the pipe, a lever pivoted to said connection a valve pin pivoted to the lever, a valve operating handle pivoted to one of said first mentioned handles and substantially parallel thereto, a link connecting said valve operating handle to said lever, and a needle valve in the tank, co-acting with the upper end of the pipe to close the same and threaded through the wall of the tank opposite said pipe.

Signed this 28 day of August, 1929, at Sioux City, in the county of Woodbury and State of Iowa.

DAVID D. LAW.